United States Patent [19]

Hudson et al.

[11] 3,966,860

[45] June 29, 1976

[54] PROCESS FOR USING A CONTOURED ASSIST PLUG FOR THERMOFORMING ORIENTED ARTICLES

[75] Inventors: Jimmie E. Hudson, Bartlesville, Okla.; Calvin D. Dockery, Bacton, England

[73] Assignee: Phillips Petroleum Company, Bartlesville, Okla.

[22] Filed: Jan. 7, 1975

[21] Appl. No.: 539,041

Related U.S. Application Data

[63] Continuation-in-part of Ser. No. 75,801, Sept. 24, 1969, abandoned.

[52] U.S. Cl. ............................... 264/94; 264/89; 264/92; 264/292; 425/387 R; 425/388
[51] Int. Cl.² ........................................ B29C 17/04
[58] Field of Search ............... 264/89, 90, 92, 93, 264/94, 97, 292, 322; 425/292, 342, 387 R, 388, 398

[56] References Cited

UNITED STATES PATENTS

| | | | |
|---|---|---|---|
| 3,167,104 | 1/1965 | Wiley et al. | 425/292 X |
| 3,291,874 | 12/1966 | Negoro | 264/89 |
| 3,461,503 | 8/1969 | Dockery | 425/342 X |
| 3,470,281 | 9/1969 | Knowles | 264/94 |
| 3,499,188 | 3/1970 | Johnson | 425/398 X |

Primary Examiner—Jan H. Silbaugh

[57] ABSTRACT

Oriented articles such as jars and the like having wall sections of exceptional uniformity are thermoformed from sheet by heating the sheet to orientation temperature and stretching it with a plug assist which has a concave surface with a flat face around the periphery thereof terminating in a radius of 1/64 to ¼-inch.. This configuration allows a controlled amount of slippage to ocur as the plug advances to stretch the sheet.

7 Claims, 4 Drawing Figures

U.S. Patent  June 29, 1976  3,966,860
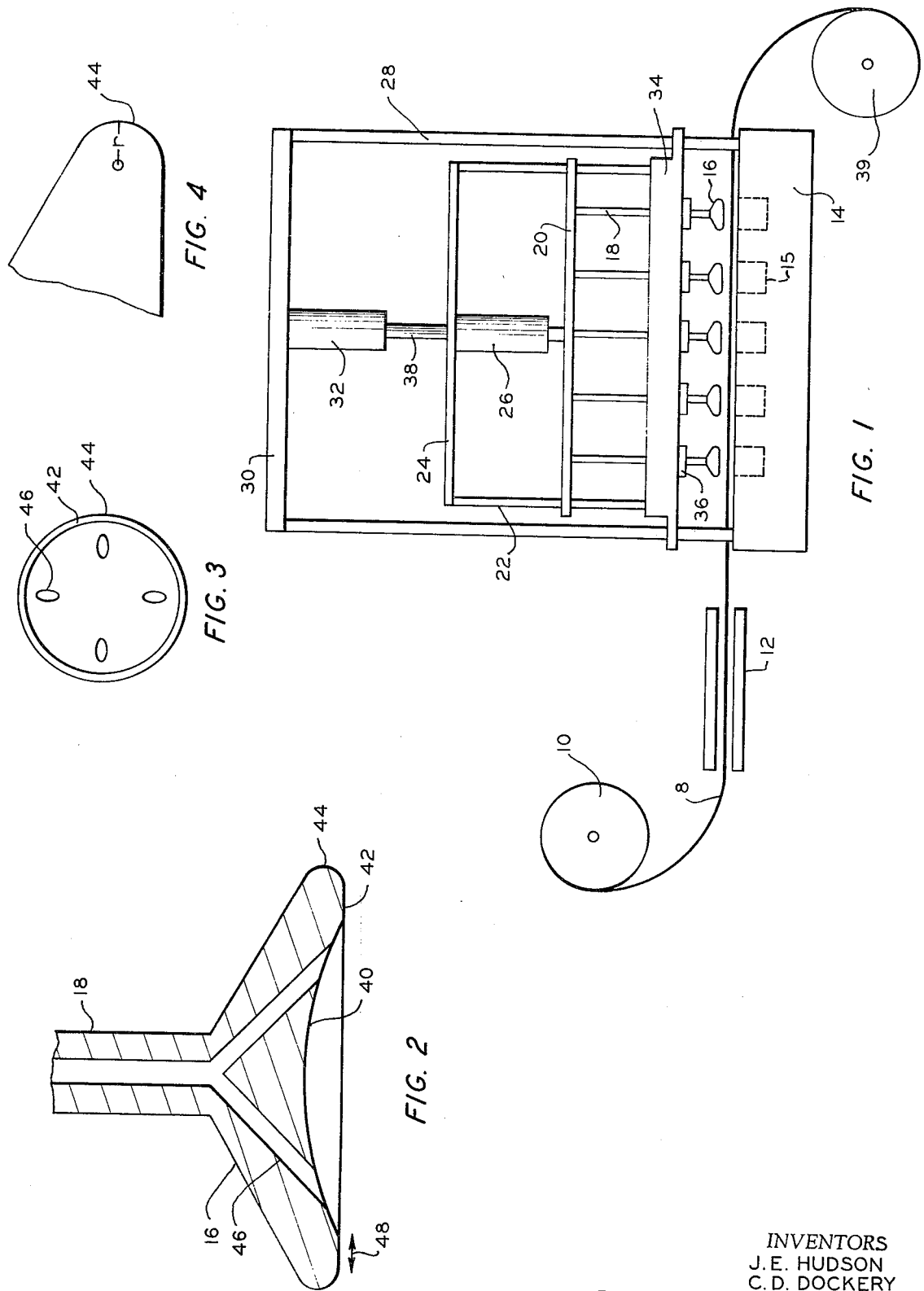
INVENTORS
J.E. HUDSON
C.D. DOCKERY
BY
Young + Zuigg
ATTORNEYS

PROCESS FOR USING A CONTOURED ASSIST PLUG FOR THERMOFORMING ORIENTED ARTICLES

CROSS REFERENCE TO RELATED APPLICATION

This is a continuation-in-part of copending application Ser. No. 75,801 filed Sept. 24, 1969, now abandoned.

BACKGROUND OF THE INVENTION

This invention relates to thermoforming open end articles such as jars at orientation temperature.

It is broadly known to form high strength hollow articles such as jars and the like from polymer sheet which has been heated to orientation temperature as is shown by Dockery, U.S. Pat. No. 3,461,503. It is also known in the conventional thermoforming art to achieve greater uniformity of wall thickness by sucking the plastic up against a concave bottom plug face or billowing it out from the plug face as shown, for instance, by Rowe, Jr., U.S. Pat. No. 2,990,581.

However, it has been found that the technology which has grown up around the ordinary thermoforming of molten sheet is not necessarily applicable to theromforming of sheet at orientation temperature. For instance, molten polyethylenes, when contacted with a plug assist, tend to exhibit no slippage past the periphery of the plug assist. This is why it is necessary in order to achieve thinning of the area under the plug assist to utilize techniques such as are shown in Rowe, Jr. Since the molten plastic under the plug assist is not going to stretch due to slippage, it is necessary to stretch it in some other way, such as by drawing it up into a deep concave surface as is shown in FIG. 3 of Rowe, Jr. However, this identical polymer, when heated to orientation temperature, has a tendency to slip past the periphery of the plug and further is not sufficiently pliable to be easily billowed back and forth; thus, techniques for achieving uniformity which work well in thermoforming molten sheet are not useful in thermoforming at orientation temperature.

SUMMARY OF THE INVENTION

It is an object of this invention to provide a process for forming oriented jars and the like having essentially uniform wall thickness throughout;

It is a further object of this invention to provide an improved process for thermoforming sheet at orientation temperature; and It is yet a further object of this invention to provide controlled slippage past a plug assist as said plug advances.

In accordance with this invention, a thermoplastic sheet is heated to orientation temperature and stretched by a plug assist having a concave forming surface with a flat face around the periphery thereof terminating in a radius of 1/64 to ¼-inch.

BRIEF DESCRIPTION OF THE DRAWINGS

In the drawings, forming a part hereof, wherein like reference characters denote like parts in the various views, FIG. 1 is a schematic representation of a thermoforming operation employing the plug assist of the instant invention;

FIG. 2 is a cross-sectional view through the plug assist of FIG. 1;

FIG. 3 is a bottom view of the plug assist of FIG. 2; and

FIG. 4 is an enlarged view of the edge of said plug.

DESCRIPTION OF THE PREFERRED EMBODIMENTS

The technique of the instant invention is applicable to thermoforming of any thermoplastic material which can be conditioned to a temperature at which molecular orientation occurs on stretching. Exemplary polymers are polymers of at least one mono-1-olefin having 2–8 carbon atoms per molecule, poly(vinyl chloride), polystyrene and other styrenecontaining copolymers such as ABS, and the like, preferably polymers or copolymers of ethylene, propylene or butene.

By orientation temperature is meant the temperature at which strengthening of the polymer results due to molecular or crystalline orientation within the polymer. For crystalline materials, orientation temperature is generally 1°–50°, preferably 2°–25°below the crystalline melting point and for amorphous materials it is about the same amount below the homogeneous melt temperature. The crystalline melt point can be determined by placing a small sample of the material to be tested on a heating stage of a polarizing microscope and recording the crystalline melt point as that temperature at which the last birefringence disappears on slow heating.

The instant invention is of utility in forming any type of hollow article such as the threaded jars shown in the Dockery patent referred to hereinabove.

The plug can be formed from any conventional structural material; however, for best results, the plug should be hardened and chromed. A hardness of 48–50 Rockwell is preferred as greater hardness may result in a plug which is unnecessarily susceptible to cracking.

The annular flat face around the periphery of the plug will have a width of about 1/32 to about ¾, preferably 1/16 to ¼-inch; the radius at the termination thereof will be about 1/64 to about ¼, preferably 1/32 to ⅛-inch, although the two are interrelated and some variations from these values are possible when molding unusually large or unusually samll articles. Further, the width of the flat annular face in the radius of the periphery thereof can be varied to tailor a plug assist to a particular mold to give almost exactly uniform wall thickness or to intentionally give a thicker section in the bottom or sides. For instance, making the flat face wider and/or the radius larger allows more of the sheet to slip past the plug assist, thus making the bottom thinner and the walls relatively thicker. Conversely decreasing the face width and/or decreasing the peripheral radius increases the drag of the sheet past the periphery of the plug assist and thus holds more material beneath the plug assist, thus making the bottom thicker and the walls relatively thinner. Except for the thread area, the resulting articles (where uniformity is desired) preferably will have no more than ±35%, more preferably no more than ±25% variation from the average wall thickness thereof.

Referring now to the FIGURES, particularly FIG. 1, there is shown a sheet 8 of polypropylene, for example, which is from 0.125 to 0.300-inch thick being passed from roll 10 to heating means 12 wherein the sheet is heated to about 325°F. Sheet 8, now heated to orientation temperature, is then passed over split mold sections 14 having cavities 15 such as are shown in more detail in said Dockery patent referred to hereinabove.

Plug assists 16 are carried by rods 18 which are connected to movable frame 20 which is slidably mounted on members 22. Plate 24 carries cylinder 26 which is attached to frame 20 and thus serves as the means to actuate plug assists 16. Upright guide members 28 connect to plate 30 which carries hydraulic cylinder 32. Movable frame 34 carries mandrels 36 and is slidably mounted on upright members 28. Piston rod 38 connects to movable frame 34 through plate 24 and members 22 and controls the vertical motion thereof. This allows separate advancement of plug assists 16 and mandrels 36, as shown in greater detail in said Dockery patent referred to hereinabove, the disclosure of which is hereby incorporated by reference. The sheet is advanced by means of shaft 39.

Referring now to FIGS. 2 and 3, there is shown in cross section plug assist 16 having a concave leading surface 40 with a flat annular face 42 around the periphery thereof terminating in edge 44 having said radius within the range of 1/64 to 1/4-inch. Channels 46 are provided in rod 18 and plug assist 16 to provide blow air in this area. The width of face 42 is shown by double arrow 48.

In operation, plug 16 initially contacts sheet 8 only around an annular area corresponding to face 42 concentric with an article forming zone within mold means 14. Thereafter, pressure is applied against said annular area to stretch said sheet. As said plug descends it continues to contact the sheet around said annular area only until it reaches the end of its descent adjacent the bottom of the mold cavity. Material slips from within the area encompassed by said annular area during said descent. This is facilitated by the fact that it is not cooled in this area by contact with the plug but rather is contacted only by the ambient air. The sheet remains at orientation temperature during this stretching operation. The inner diameter of the mold is sufficiently greater than the outer diameter of the plug that the sheet does not contact the sides of the mold during this descent but rather first contacts the sides of the mold on imposition of a fluid pressure differential between the interior of the thus stretched sheet and the space between the sheet and the sides of the mold. This is not meant to preclude contact in a neck area where it may in some instances be desirable to form the threads before the stretching is complete. The stretched sheet is caused to conform to the mold zone by differential fluid pressure created by a vacuum pulled through the walls of the mold and/or pressure introduced through channels 46.

FIG. 4 shows in greater detail edge 44 with radius $r$ of, for instance, 1/16-inch.

Many conventional parts, such as temperature controllers, motors, brackets, and the like have been omitted for the sake of simplicity, but their inclusion is understood by those skilled in the art and is within the scope of the invention.

EXAMPLE

Propylene homopolymer having a density of 0.905 (ASTM D 1505-63T), a melt flow of 2 (ASTM D 1238-62T, Condition L), and a crystalline melting point of about 340°F was extruded into flat sheet having a thickness of 3/16 of an inch and allowed to cool to room temperature. The sheet was then reheated by passing through a long heated block which was kept at a temperature of 324°–328°F. The sheet traveled through the block at a rate sufficient to allow a 20 minute heating time during which time the sheet was heated to a temperature between 3° and 5° below the temperature of the heating block. The resulting heated sheet was placed into a vacuum-forming device similar to that shown in the FIGURES and a plug assist such as is shown in the drawings was lowered into contact with the sheet. The plug assist had a concave lower surface and a flat annular face around the periphery thereof, said face having a width of 1/16 of an inch. The face terminated around the periphery thereof with a radius of about 1/8-inch. The plug assist continued to descend, stretching the plastic into the mold cavity with a portion of the sheet beneath the plug assist slipping past the edge thereof during this descent. A mandrel was lowered to force the sheet around the upper rim of the container into conformity with the thread-forming area and blow pressure was introduced via lines in the plug assist cause the plastic to conform to the shape of the mold cavity. The resulting article had a wall thickness just below the shoulder thereof of 0.031-inch; a thickness approximately one-fourth of the way down the side wall of 0.027-inch; a thickness a little past half-way down the side wall of 0.025-inch; a thickness about two-thirds of the way down the side wall at the inward projection of an inward strengthening ridge of 0.027; a thickness near the bottom of said side wall of 0.021; a bottom thickness about a fifth of the way in from the side wall of 0.025-inch; a bottom wall thickness about two-thirds of the way between the side wall and the center of 0.025-inch; and a bottom wall thickness at the center of 0.025-inch. Thus, the 3/16-inch sheet was stretched down to form a bottle having walls approximately 26 mils thick with exceptional uniformity. Because the stretching was done at orientation temperature, the resulting bottle also had exceptional clarity and walls which exhibited high impact strength.

While this invention has been described in detail for the purpose of illustration, it is not to be construed as limited thereby, but is intended to cover all changes and modifications within the spirit and scope thereof.

We claim:

1. A process for forming high strength, open end articles from thermoplastic sheet comprising:
   heating said sheet to orientation temperature;
   contacting said sheet initially only around an annular area concentric with an article-forming zone;
   applying pressure against said sheet along said annular area to stretch said sheet and cause slippage of polymer from within the area encompassed by said annular area said contact during said stretching continuing to be only along said annular area, said sheet encompassed by said annular area being contacted only by ambient air during said stretching; and
   expanding said thus stretched sheet which has not yet contacted side walls of said forming zone by differential fluid pressure into conformity with said forming zone.

2. A method according to claim 1 wherein said sheet is comprised of a polymer of at least one of ethylene, propylene, and butene.

3. A method according to claim 1 wherein said sheet is polypropylene and wherein said sheet is heated to an orientation temperature of 1°–50°F below the crystalline melting point thereof.

4. A method according to claim 1 wherein said article is an open end jar.

5. A method according to claim 1 wherein fluid is introduced into the area encompassed by said annular area.

6. A method according to claim 1 wherein said annular area has a width of 1/32 to 3/4 inch.

7. A method according to claim 6 wherein said contact of said sheet around an annular area is made with a metal plug.

* * * * *